Figures 1, 3, 4:
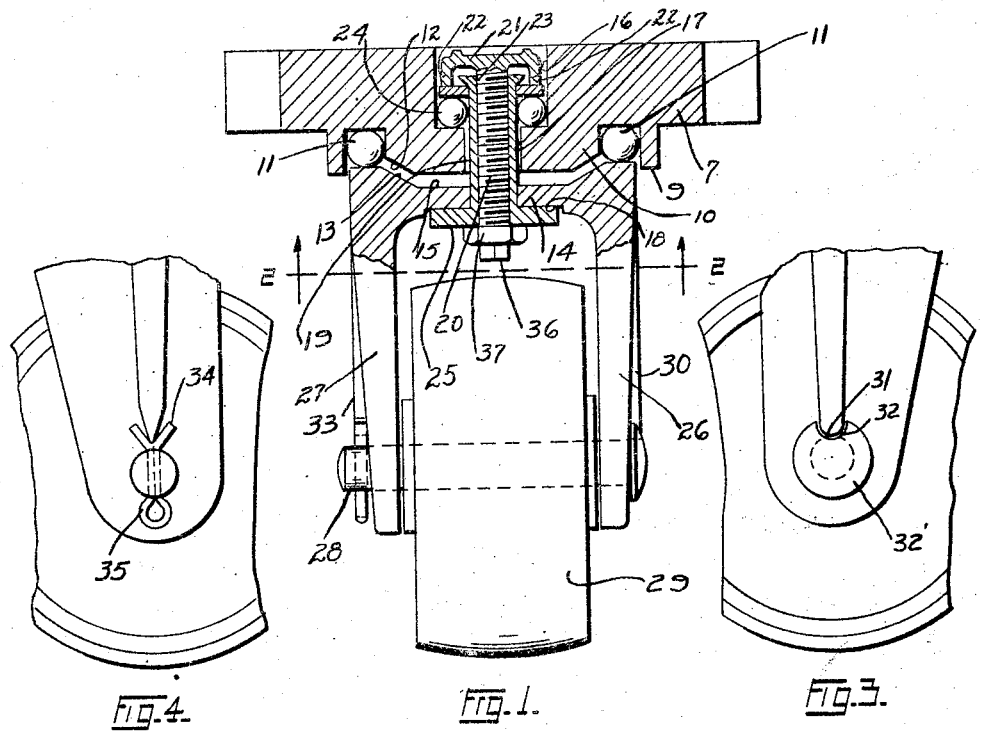

April 13, 1926.

E. A. HELLER

CASTER

Filed Oct. 13, 1924

1,580,245

Inventor
Edward A. Heller

Patented Apr. 13, 1926.

1,580,245

UNITED STATES PATENT OFFICE.

EDWARD A. HELLER, OF DETROIT, MICHIGAN.

CASTER.

Application filed October 13, 1924. Serial No. 743,289.

*To all whom it may concern:*

Be it known that I, EDWARD A. HELLER, a citizen of the United States, residing at Detroit, in the county of Wayne and State of Michigan, have invented a new and useful Improvement in a Caster, of which the following is a specification.

My invention relates to a new and useful improvement in a caster and has for its object the provision of a caster having ball bearings adapted for receiving the thrust delivered to the caster, said ball bearings being positioned in non-planar sets, the upper set of balls being adapted to receive the horizontal thrust, and in this way, attaining a greater height in the mounting of the caster, so as to permit a more sensitive swivelling than when the balls are placed on the same horizontal plane.

Another object of the invention is to place one set of balls directly around and lying against the vertical pintle of the caster and so positioned as to engage the side walls of a cup in which they are placed, thus relieving to the maximum the friction incident to the swivelling of the caster and consequently, increasing the efficiency of the caster.

Another result from placing the row of balls around the vertical pintle in a cup is the use of a lesser amount of balls, which also results in easier swivelling and affords an economical structure in manufacture.

Another object of the invention is the provision of a washer embracing the pintle for retaining the pintle engaging balls in the cup and for affording means for adjusting the position of the washer relatively to the balls, thus presenting a means for retaining the washer in contact with the balls, as the various parts become worn, thus preventing the balls from dropping or being otherwise removed from their normal position.

Another object of the invention is to provide a vertical pintle with a flat square head which permits the same to be seated or anchored in the recess of the underside of a yoke, thus permitting a generous portion of the head to extend downwardly, affording a reinforcement for the yoke by means of the head, itself. This reinforcement is directed to that portion of the housing which is subjected to the greatest strain resulting from side thrust.

Another result of having the head so constructed is the absorption of shock which is delivered on the upper point of the pintle when the same is being swelled to prevent a removal of the washer from the pintle, the washer being first set on the pintle and the pintle swelled or partly riveted to retain the washer in position.

Another result of having a square head mounted in a recess is the prevention of a rotation of the pintle relatively to the yoke, so that the hole in the yoke is not worn by the pintle which extends therethrough, as would be the case upon a relative rotation of these parts.

Another object of the invention is the provision of a caster having a pintle adapted for supporting the rotatable wheel and provided with a slot for engaging a rib on the downwardly projecting portions of the yoke, so as to prevent the pintle from rotating.

Another object of the invention is the provision of a recess in the top of the yoke for receiving lubricants which may be deposited therein, said yoke being adapted for retaining said lubricants and preventing their escape, thus affording a lubrication of the relatively movable parts at all times.

Other objects will appear hereinafter.

The invention consists in the combinations and arrangements of parts hereinafter described and claimed.

Figure 2:
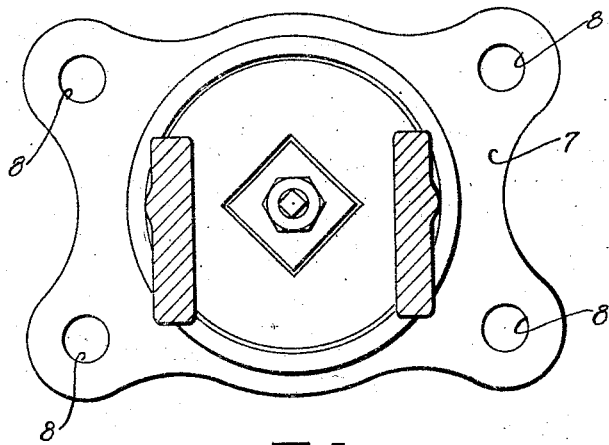

The invention will be best understood from a reference to the accompanying drawings which form a part of this specification and in which, Fig. 1 is a view of the invention showing a part in elevation and a part in a central vertical sectional view, Fig. 2 is a sectional view taken on substantially line 2—2 of Fig. 1, Fig. 3 is a fragmentary side elevational view of the lower portion of the invention, Fig. 4 is a fragmentary side elevational view of the lower portion of the invention from the opposite side.

The caster comprises an attaching plate 7, which is provided with suitable openings 8 for receiving attaching means for attaching the attachment plate to the body upon which it is to be used. The caster set forth in the invention is adapted for the general use to which casters are customarily applied. The attaching plate is provided with an annular flange 9, projecting outwardly from the under face thereof. Projecting from the same face is a circular boss 10, the space between the periphery of the boss 10 and the flange 9 providing a raceway for balls 11, which are positioned therein. A portion 12 of the undersurface of the boss 10 is bevelled to lie in parallel relation with an inclined surface 13 of a supporting yoke which is used with the attaching plate, a space separating the inclined surface 12 and the inclined surface 13. The main body of the yoke 14 is in spaced relation to the boss 10, to provide a space 15. The attaching plate 7 is provided with a recess 16 leading from which centrally thereof is a passageway 17. The yoke 14 is provided, on its undersurface, with a secondary recess 18. A pintle 19 is projected through an opening formed in the upper wall of the yoke 14 and through the passageway 17 into the recess 16. The pintle 19 affords a snug or pressfit with the yoke 14. This pintle is provided with an interiorly threaded bore in which is threaded a stem 20, which is provided on its upper end with a head 21 having a downwardly projecting flange 22, which engages the upper surface of a washer 23 positioned on the pintle 19 in embracing relation, said pintle 19 being swelled or slightly riveted over the washer 23, so as to retain the same in assembled relation on the pintle 19. Ball bearings 24 are positioned in the recess 16, so as to engage the base of the recess, the inner walls of the recess and the undersurface of the washer 23. It will be noted that the balls 24 engage against the inner surface of the recess 16, which is formed circular and against the periphery of the pintle, so that there is no play between the pintle and the side walls of the recess. It is also to be noted that the washer 23 is of less diameter than the diameter of the recess 16, so that no engagement is had between the side walls of the recess and the periphery of the washer. It is also to be noted that the balls 24 are of less diameter than the balls 11, the difference in the balls permitting a more compact structure in manufacture. It is also to be noted that the lower surface of the balls 24 are tangent to the same plane as the upper surface of the balls 11. It is also to be noted that the balls 11 are arranged in a larger circle than the balls 24. This arrangement is such that the side thrust delivered to the caster is directed longitudinally of the pintle 19 in the maximum degree. This results from the bearing points which are pressing as the side thrust will be delivered to the balls 11 and to the balls 24. The arrangement of having these balls in separate planes transforms the pintle 19 when side thrust is delivered thereto into a double fulcrumed lever, whereas, were the balls 11 and 24 to afford bearing points on the same plane, a greater leverage would result, inasmuch as the pintle 19 would then become a single fulcrumed lever, the point of fulcrum being at that point where the balls 24 engage.

The structure is a durable one for receiving side thrusts. By arranging the balls in this relative position, a reduction of friction is brought about and the swivelling of the housing relatively to the attaching plate becomes easier.

The head 25, which is provided on the pintle 19, is square so as to fit snugly in the recess 18, thus preventing a relative rotation of the pintle 19 and the yoke 14. By maintaining the pintle in fixed relation to the yoke 14, the wear incident to a rotation of the pintle in the yoke is eliminated, thus affording a greater life to the yoke itself. It will be noted that the head 25 extends over a large portion of the upper wall of the yoke 14 and in this way, the yoke is reinforced, so that a side thrust transmitted through the pintle 19 to the yoke 14 is delivered to the housing over a large area through the head 25.

Projecting downwardly from the yoke 14, are standards 26 and 27, each provided with an opening in alinement with the opening in the opposite standard for the reception of an axle 28 upon which is rotatably mounted the caster wheel 29. Formed on the outer face of the standard 26 is a rib 30 having the lower end 31 thereof formed semi-circular and adapted to project so as to engage in a groove 32 formed in the head 22' of the axle 28, to prevent rotation of the axle relatively to the standard. Formed on the standard 27 is a rib 33 which terminates at its lower end 34 in a wedge-shaped formation, so as to spread the opposite ends of a cotterpin 35, which is projected through the axle 28. It is thus seen that the axle is prevented from rotating and that the ribs 30 and 33, in addition to serving the functions already mentioned, also serve to reinforce these downwardly projecting standards, to strengthen them for performing the various functions required of them.

By providing the space 15, it is evident that lubrication positioned within this space, after use will be retained and there is no passage of escape for the same, inasmuch as the pintle 19 is a pressfit with the yoke 14. Thus it will be apparent that the moving parts will always have lubrication present inasmuch as the lubrication will be permitted to creep upwardly of the axle, so as to lubricate the balls 24 and to move outwardly to lubricate the balls 11.

When the balls 24 become worn, or the engagement between the balls and the washer 23 becomes loose, an adjustment of these parts relatively to each other may be had by threading the stem 20 in the shaft 19, thus bringing the engagement legs 22 and 22' downwardly in the recess 16, so as to press the washer firmly against the balls 24. In order to effect this, the lower end 36 of the stem 20 is formed square, or such a formation as to permit the holding of the stem by a wrench, in order to effect a turning of the same in the pintle 19. It will be apparent that the pintle 19 cannot turn on account of the engagement of the head 25 in the recess 18. A suitable lock nut 37 is positioned on the lower end of the stem 20.

While I have illustrated and described the preferred form of structure, I do not wish to limit myself to the precise form of structure shown, but desire to avail myself of such variations and modifications as come within the scope of the appended claims.

Having thus described my invention, what I claim as new and desire to secure by Letters Patent is:

1. A caster comprising an attachment plate having a recess formed in its upper surface; a supporting yoke having a recess formed in its under surface; a pintle separate from said plate and yoke projected into said recess in said plate and provided with a head adapted for seating in the recess formed in said yoke, said pintle being non-rotatable relatively to said yoke, and adapted to rotate relatively to said plate upon rotation of said yoke relatively to said plate on said pintle as an axis; ball bearings mounted in said plate recess and adapted for engaging the periphery of said pintle and the inner surface of said plate recess; and a washer permanently mounted on said pintle in engagement with said ball bearings and serving for retaining said ball bearings in engagement with the base of said plate recess.

2. A caster comprising an attachment plate having a recess formed in its upper surface and provided with an opening formed therein communicating with said recess; a supporting yoke having a recess formed on its under surface and provided with an opening communicating with said recess, the opening in said yoke registering with the opening in said attachment plate; a cylindrical attachment member projected through the opening in said yoke in a press fit and projected into the opening of said attachment plate loosely, the diameter of the opening in said attachment plate being slightly larger than the diameter of the opening in said yoke; a head mounted on said attachment member and engaging in the recess formed in said yoke for preventing relative rotation of said yoke and said attachment member; ball bearings positioned in said plate recess and engaging the periphery of said attachment member and the inner surface of said recess for affording a bearing for rotation of said attachment member relatively to said attachment plate; and means mounted on said attachment member for retaining said ball bearings in engagement with the base of said plate recess.

In testimony whereof, I have signed the foregoing specification.

EDWARD A. HELLER.